May 7, 1968 H. P. WERTHEIMER ET AL 3,381,616

ELECTROMAGNETIC FLUID PUMP

Filed July 13, 1966 2 Sheets-Sheet 1

WITNESS:
Esther M. Stockton

INVENTORS
Ralph V. Brown
Harry P. Wertheimer
BY
W. S. Thompson
ATTORNEY

ELECTROMAGNETIC FLUID PUMP

Filed July 13, 1966 2 Sheets-Sheet 2

Ralph V. Brown
Harry P. Wertheimer
INVENTORS

BY
W. S. Thompson

United States Patent Office 3,381,616
Patented May 7, 1968

3,381,616
ELECTROMAGNETIC FLUID PUMP

Harry P. Wertheimer, Horseheads, and Ralph V. Brown, Cayuta, N.Y., assignors to The Bendix Corporation, a corporation of Delaware
Filed July 13, 1966, Ser. No. 565,004
9 Claims. (Cl. 103—53)

ABSTRACT OF THE DISCLOSURE

A reciprocating plunger electromagnetic fluid pump in which plunger motion is controlled by solid state circuitry and electromagnetic coils. A switching transistor, alternately in the conducting and non-conducting states, drives the plunger against a spring when the transistor is conducting and when the transistor is in the non-conducting state the field in the main pump coil collapses and the spring drives the plunger back. The transistor is held in the non-conducting state during the back-travel of the piston by a second coil which is magnetically linked to the plunger. Transistor protection is provided by any of a variety of voltage limiting devices to control the base-to-collector voltage.

The present invention relates to electromagnetic fluid pumps and, more particularly, to electromagnetic fluid pumps having solid state circuitry for reciprocating a plunger.

It is an object of the present invention to provide a solid state circuit and electromagnetic fluid pump combination having a low-cost transistor-oscillator circuit.

It is an object of the present invention to provide an electromagnetic fluid pump having solid state circuitry in which electric transient times are low.

It is an object of the present invention to provide a solid state circuit for an electromagnetic piston fluid pump in which piston travel is assured to be the maximum allowed by the mechanical circuit.

It is an object of the present invention to provide an electromagnetic fluid pump in which circuit reliability is greatly increased and transistor failure significantly decreased.

It is an object of the present invention to provide a novel circuit design for an electromagnetic fluid pump employing a transistor oscillator in which the transistor is protected from excessive voltage transients.

It is a further object of the present invention to provide a one-piece, fully-enclosed electromagnetic fluid pump having a solid state circuit.

It is a further object of the present invention to provide a transistor oscillator circuit for an electromagnetic fluid pump having a Zener diode disposed between the base and collector of the transistor to protect the transistor against breakdown voltage surges.

It is a further object of the present invention to provide a transistor oscillator circuit for an electromagnetic fluid pump which assures that plunger travel will be the maximum mechanically permissible over the full range of pump operating temperatures.

It is a still further object of the present invention to provide a transistor oscillator circuit for an electromagnetic fluid pump which provides a greater design flexibility in selecting the transistor base drive and in selecting and varying transistor turn-on current.

It is a still further object of the present invention to provide a temperature compensated, transistor oscillator electromagnetic fluid pump which has greater fluid output in its pressure range than prior art pumps.

The foregoing and other additional objects and advantages of the present invention will appear more fully hereafter from a consideration of the detailed description which follows, taken together with the accompanying drawing wherein an embodiment of the present invention is illustrated. It is to be expressly understood, however, that the drawing is for the purpose of illustration and description and is not to be construed as defining the limits of the invention.

Figures 1, 2:
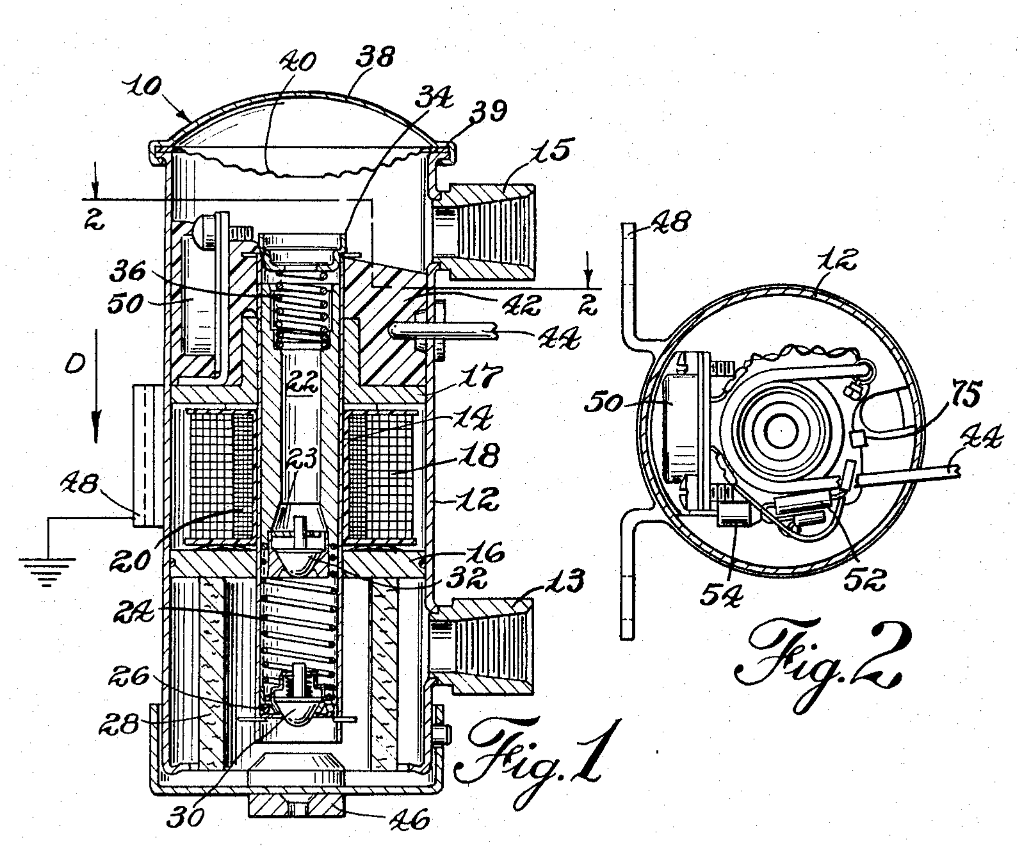
FIGURE 1 shows a sectional view of an electromagnetic fluid pump embodying the present invention.
FIGURE 2 is a view taken along the section lines 2—2 of the pump shown in FIGURE 1.

Turning now to FIGURE 1, the numeral 10 indicates generally an electromagnetic fluid pump having a generally-cylindrically housing 12 with a fluid inlet 13 and fluid outlet 15. Contained within the housing 12 is a guide or cylinder member 14 which is supported within the housing by pole members or annuli 16 and 17. Disposed intermediate the pole members 16 and 17 are a first winding 18 and a second winding 20 which are disposed coaxially with the guide member 14 and with a reciprocal piston member 22 which moves reciprocally relative to the guide member 14. A spring member 24 is compressively confined between a lock ring 26 at one end of the guide member 14 and one transverse end of the piston member 22.A filter member 28 is disposed intermediate the fluid inlet 13 and the inlet 23 to the piston member. A plurality of valves 30 and 32 are disposed in the fluid path through the guide member 14 to prevent fluid flow other than unidirectional fluid flow from the inlet to outlet through the reciprocal piston member 22 in the well known manner.

At the upper end of the piston member 22 is disposed an abutment member 34 which compressively confines a spring member 36 intermediate the piston 22 and the abutment member 34 for providing a cushion for the piston member when it reaches the top of its stroke. A cap member 38 is clamped or otherwise fitted around the housing 12 as shown in 39 to provide a fluid-tight seal. A diaphragm 40 is rigidly attached to the rim of the cap 38 as also shown at 39 so that the interior of cap 38 constitutes a hermetically-sealed chamber.

Figure 3:
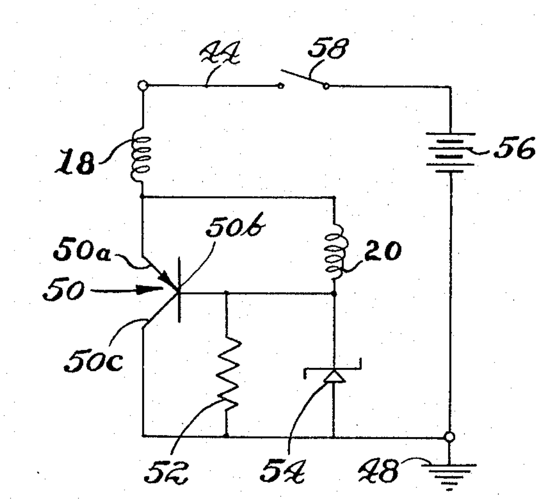
FIGURES 3, 4, 5 and 6 are electrical diagrammatic views of embodiments of the solid state circuitry of the present invention.

An epoxy or other moldable material 42 aids in holding the various pump parts in position and is further useful in holding various electrical components, shown in FIGURE 2 in place. Electrical components which are housed within the housing 12 include a transistor member 50, a Zener diode member 54 and a resistor member 52. The coils 18 and 20 are electrically connected to the transistor 50, Zener diode 54, and resistor as shown in FIGURE 3 and an external source 56 such as a battery, also shown in FIGURE 3. Returning now to FIGURE 1, the electrical input from the battery is shown by lead wire 44, the other electrical lead being supplied by the grounded mounting bracket 48 of the pump which is fastened to the housing member 12. A bolt or nut member 46 is fastened to the bottom cap 47 to enable servicing of the filter 28.

Turning now to the electrical circuit shown in FIGURE 3, a transistor member 50 having an emitter lead **50*a*, a base lead 50*b*, and a collector lead 50*c* has the emitter lead 50*a* connected to the main coil or first winding 18 which is connected to the voltage source which is shown as a battery 56. The collector lead 50*c* is connected to the ground side of the voltage source 56. The second coil or second winding 20 is interconnected between the emitter lead 50*a* and the base lead 50*b* of the transistor. A resistor member 52** is connected between the base lead 50*b* and ground lead 48 and a Zener diode member 54 is connected between the base lead 50*b* and the collector lead 50*c* and which is also grounded at 48. The second coil 20 may be considered to be a signal or detection coil.

It can readily be appreciated that the voltage source 56 might be a battery or some other source such as a rectified AC source. It should be further appreciated that the transistor 50, while shown as a PNP transistor, might as well be an NPN transistor and that the polarity of the elements would be reversed. If an NPN transistor were used, the Zener diode 54 would be reversed, that is, it would have its anode connected to the base of the transistor rather than to the ground or low side of the voltage source 56. If an NPN transistor were used, current and voltage directions would be reversed from those in the description of the circuit operation which follows. When switch 58 is closed, the source 56 voltage appears on the emitter 50*a* of the transistor 50. This voltage causes a current to flow through the second coil 20 and resistor 52. This current flow causes a voltage drop across the second coil 20 which, in turn, causes the base 50*b* of the transistor 50 to be at a lower voltage than the emitter 50*a*, initiating "turn on" or conduction in the forward direction of the transistor 50. As the transistor 50 reaches "turn on," current will start to flow in the first coil 18. The first coil 18 and the second coil 20 are magnetically linked such that current in the first coil generates a current in the second coil 20 which flows toward the emitter 50*a* of the transistor 50. As current builds up in the coil 20, the transistor 50 is driven toward saturation, that is, resistance to current flow from the emitter 50*a* to the collector 50*c* is minimized, causing current through the coil 18 to drive the plunger or piston member 22 in a downward direction, as shown by arrow "D" in FIGURE 1 and to cause compression of the spring 24. The current which builds up in first coil 18 may cause the magnetic circuit, which includes the first and second coils and the pole pieces, to approach saturation. When magnetic saturation is approached or when the current in coil 18 approaches a steady state value, the bias of the transistor 50 in the forward direction, due to the magnetic linking of the coils 18 and 20, becomes insufficient to support the transistor 50 in an "on" or forward conducting mode. The transistor is then caused to turn "off" and the coil 18 to discharge its energy very rapidly, largely through the Zener diode 54 by way of the coil 20. Turn-off of the transistor 50 enables the spring 24 to propel the plunger back toward its initial position and closes the valve member 32, causing fluid to be carried by the piston and pushed out of the outlet 15, completing a pumping cycle.

During collapse of the magnetic field, the induced voltage in the coil 20 back biases or reverse biases the transistor 50, assuring the transistor "turn off." The reverse induced voltage in the coil 20 counter balances the voltage drop across the coil 20, resulting from the resistivity of coil 20. Thus the voltage between the emitter and base of the transistor is limited to a level which is safe for the transistor. As the voltage across coil 20 builds up as a result of the collapsing magnetic field, the Zener or avalanche diode 54 reaches its Zener point. At the Zener point, the Zener diode has a very low resistance which permits a large current flow to the series connection of the first coil 18, the second coil 20, and the Zener diode 54. Zener member 54, however, maintains the base to collector voltage to an acceptable maximum for the transistor.

A relatively large power loss ($I^2R$) in the second coil 20 allows the Zener diode 54 to dissipate a smaller amount of power, thus reducing the cost of the Zener diode member. Furthermore, the Zener diode member is able to clamp electrically not only the base to collector voltage of the transistor, permitting a lower cost transistor, but also provides a safe limit to the base to the emitter voltage of the transistor because of the use of the second or signal coil member 20 as the conduit for the collapsing field energy stored in the main coil 18. This latter effect occurs because the collapsing field induces a voltage across coil 20 which opposes the resistively-caused voltage across coil 20 which results from current through coil 20. This is a distinct advantage over the arrangement of a Zener diode between emitter and collector wherein emitter to collector voltage is limited, but not base to collector voltage. The disclosed use of the Zener respectively limits voltage to all three transistor terminals to a safe level and enables the use of a lower cost transistor member. Further the present circuit design enables the number of signal coil turns, 20, to be chosen independently of the number of main coil turns, 18, so that a sufficient value of "turn on" current is possible without exceeding transistor member 50 breakdown voltages upon collapse of the magnetic field generated by coil 18.

Figures 4, 5, 6:
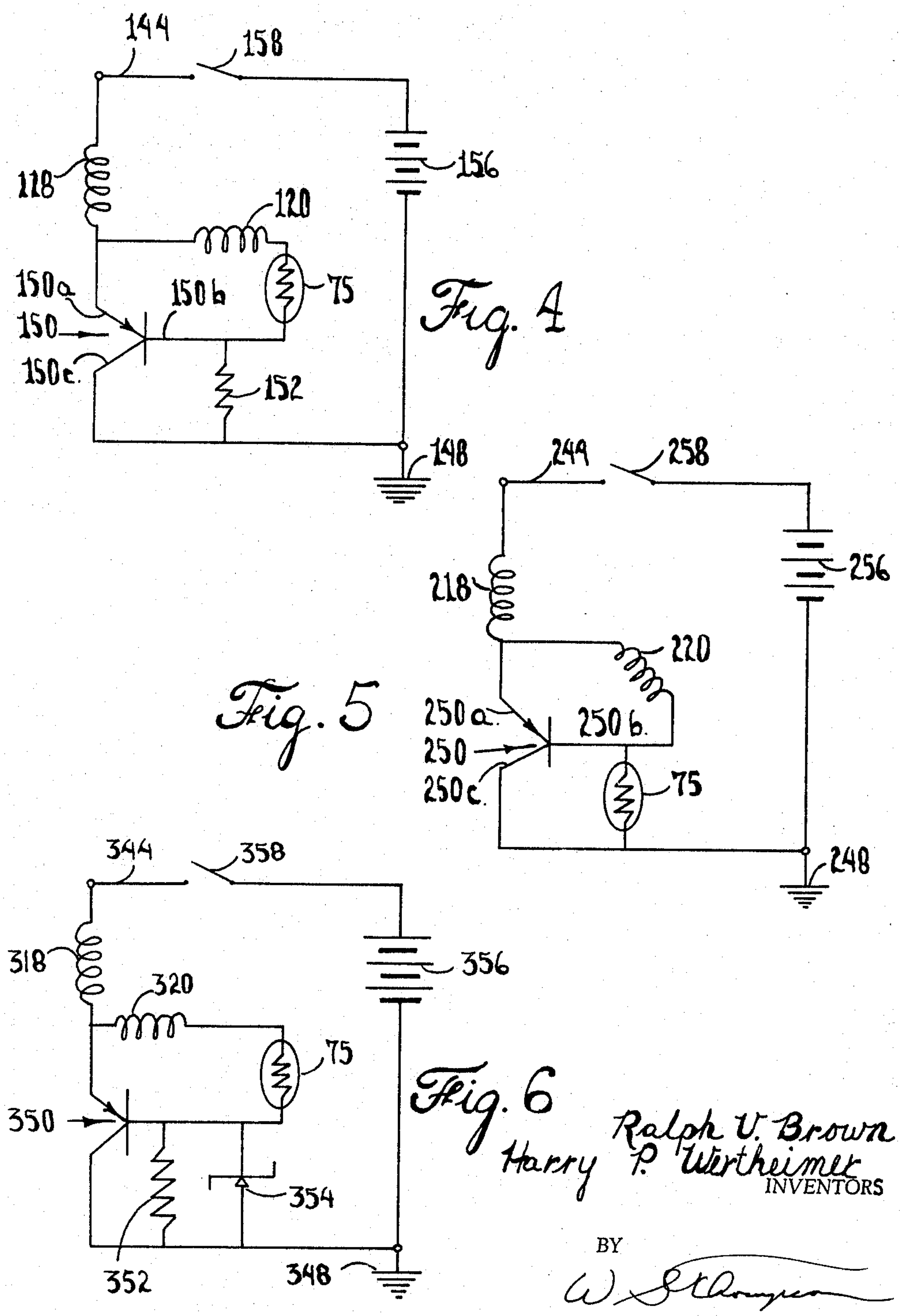

In the embodiments of the electrical circuitry shown in FIGURES 4, 5 and 6, like parts are shown by like numerals in the 100, 200 and 300 series respectively without further explanation; for example, the main coil member bears the numeral 18 in FIGURE 3, 118 in FIGURE 4, 218 in FIGURE 5 and 318 in FIGURE 6.

In the embodiment of the invention shown in FIGURE 4, a negative temperature coefficient resistor member 75 is placed in electrical series relationship with the detector coil 120. The resistor member 75 may be a thermistor or some other negative temperature coefficient device. A diode (not shown) or a series in combination of a diode and resistor (not shown) may be added in parallel with the main coil member 118 to provide a discharge path for the energy stored in the coil 118 during one part of the pumping cycle.

Turning now to the embodiment of the present invention shown in FIGURE 6, a negative temperature coefficient resistor member 75″ is in electrical series relationship with the detection coil 320 and the emitter-base circuit of the transistor member 350.

If the pump of the present invention were to be used as a fuel pump for an automobile, it is required that the initial "turn-on" bias for the transistor be sufficient to insure actuation of the pump at temperatures below minus forty degrees Fahrenheit (−40° F). "Turn-on" bias refers to that voltage on the emitter with respect to the base which is required to initiate emitter-collector current flow at the start of the pumping cycle. In FIGURE 6, this bias would be the voltage drop across the series combination of coil 320 and resistor member 75″. At a given supply 356 voltage, the "turn on" bias will be determined by the relative magnitude of the resistance of the series combination of coil 320 and a resistor member 75″ in comparison with the resistance of resistor member 352, as well as the transistor's base to collector leakage.

If the resistances of coil 320 and resistor members 75″ and 352 are established to provide the required "turn on" bias at low temperatures, such as minus forty degrees Fahrenheit (−40° F), good pump performance at more normal operating temperatures would necessitate a (premium) transistor with high gain, were it not for the reduced resistance of resistance member 75″. A low gain (economical) transistor may be used even at −40° F, since the gain of power transistors generally increases at low temperatures. "Turn-on" bias at the more normal temperature. This leakage current flows in a parallel path base to collector leakage current increases with increasing temperature. This leakage current flows in a parallel path to the current in resistor member 352, causing the current to increase in the series combination of coil 320 and resistor member 75″. Since the resistance of member 75″ is lower at the normal temperatures, the voltage drop across the series combination, which is the "turn-on" bias, is nearly constant over a wide range of temperature.

A further advantage of the use of a negative temperature coefficient resistor member such as 75 or 75″ is realized in some embodiments of the present invention. This advantage is the prevention of "premature termination" of the "off" portion (pumping stroke) of the cycle. "Premature termination" will result if the "turn on" bias is large in comparison to what is needed, and if the piston member 22 is retarded in its upward travel. Such "premature termination" may result in loss of pump performance (delivery) at the higher pressures.

In the embodiment shown in FIGURE 5 a positive temperature coefficient resistor member 75' is connected to the base and collector of transistor member 250. The resistor member 75' has its lowest resistance at the lowest temperature. The effect of this on "turn on" bias is the same as previously described for a negative coefficient resistor (75 or 75'') placed in the circuit as shown in FIGURES 4 and 6.

It can thus be appreciated that the present invention achieves all of its stated objects and provides a low cost, high performance, highly reliable transistor oscillator circuit in combination with an electromagnetic reciprocating piston pump. The increase in reliability is insured by the use of the Zener diode member which is connected between the base and the collector of the transistor and serves to stabilize not only base and emitter to collector voltage, but emitter to base reverse voltage, permitting a lower cost transistor. Further, this position of the Zener diode member enables a lower cost Zener member since the signal coil or second coil 20 is providing a significant portion of the power loss when the large main coil current is passed through it. The present invention allows the main coil 18 to discharge substantially completely, thereby assuring full pump output volume and pressure per cycle. The present invention significantly reduces main coil discharge time, thus increasing the pump fluid output over its pressure range. In addition, when operation over a wide range of temperature is considered, the combination of Zener diode and thermistor members produces a higher output than any other embodiment of the present invention. Still further, the thermistor member increases fuel output at the higher pressures in the normal pressure range, when compared to an identical fluid pump without such a circuit element, providing both pumps are to be used over the usual range of outdoor temperatures.

It can be appreciated that although coil members 18 and 20 are shown, that any other form of current sheet could be used such as a solid sheet of conducting material.

We claim:

1. A fluid pump powered by an electrical source comprising:
- a reciprocating means;
- a first coil member;
- a second coil member magnetically linked to said first coil member by the reciprocating means;
- a transistor member having an emitter, collector and base;
- said first coil connected between said electrical source and said emitter;
- said second coil connected between said emitter and said base;
- a Zener diode member connected between said base and said collector; and
- said collector for connection to said electrical source.

2. The pump as claimed in claim 1 including further:
- a negative temperature coefficient resistive means connected in electrical series relationship with said second coil.

3. The pump as claimed in claim 1 including further:
- a positive temperature coefficient resistive means connected between the collector and base of said transistor.

4. A fluid pump powered by an electrical source comprising:
- a reciprocating means;
- a first coil member;
- a second coil member magnetically linked to said first coil member by the reciprocating means;
- a transistor member having an emitter, collector and base;
- said first coil connected between said electrical source and said emitter;
- said second coil connected between said emitter and said base;
- a temperature responsive resistive means connected relative to the transistor member to assure full piston travel over a broad temperature range; and
- said collector for connection to said electrical source.

5. The pump as claimed in claim 4 wherein:
- said temperature responsive resistive means is connected in electrical series relationship with said second coil.

6. The pump as claimed in claim 4 wherein:
- said temperature responsive resistive means is connected between the collector and base of said transistor.

7. A fluid pump powered by an electrical source comprising:
- a hollow guide means having a fluid inlet and a fluid outlet;
- a piston member slidably disposed in said guide member for reciprocal movement;
- an electrical source of magnetic flux for creating a magnetic field having a component substantially parallel to said piston member reciprocal path;
- detection means magnetically linked to said electrical source of magnetic flux for generating an electrical signal;
- a transistor member having an emitter, collector and base;
- said detection means disposed between said emitter and said base;
- electrical valve means having a characteristic of passing substantially no current until a predetermined bias level is exceeded and passing relatively large currents at levels slightly exceeding said predetermined bias level, said valve means disposed between said base and said collector; and
- said collector connected to said electrical valve means and for connection to the source of electrical potentials.

8. The fluid pump as claimed in claim 7 wherein:
- said electrical source of magnetic flux is magnetically linked to said detection means such that a positive current in said electrical source of magnetic flux produces a negative voltage in said detection means.

9. The fluid pump as claimed in claim 8 including further:
- a negative coefficient temperature responsive means in electrical series relationship with said detection means.

References Cited

UNITED STATES PATENTS

| | | | |
|---|---|---|---|
| 3,134,938 | 5/1964 | Morgan ---------- | 103—53 XR |
| 3,250,219 | 5/1966 | McCarthy, et al. ----- | 103—53 |

ROBERT M. WALKER, *Primary Examiner.*